(12) United States Patent
Humphreys

(10) Patent No.: US 7,144,048 B2
(45) Date of Patent: Dec. 5, 2006

(54) COMPOSITE MARINE RISER

(75) Inventor: Gavin Humphreys, Aberdeen (GB)

(73) Assignee: Stena Drilling Ltd., Aberdeen (GB)

( * ) Notice: Subject to any disclaimer, the term of this patent is extended or adjusted under 35 U.S.C. 154(b) by 218 days.

(21) Appl. No.: 10/839,421

(22) Filed: May 5, 2004

(65) Prior Publication Data
US 2005/0249558 A1    Nov. 10, 2005

(51) Int. Cl.
*F16L 47/00* (2006.01)
(52) U.S. Cl. .............. 285/290.3; 285/290.4; 285/291.1; 285/222.4; 166/367; 29/890.14
(58) Field of Classification Search .. 285/222.1–222.5, 285/290.1–290.4, 291.1, 293.1, 414, 333, 285/334; 29/890.14; 405/224.4, 224.2; 166/367
See application file for complete search history.

(56) References Cited

U.S. PATENT DOCUMENTS

| | | | | |
|---|---|---|---|---|
| 1,440,508 | A * | 1/1923 | Todd | 285/222.2 |
| 3,339,945 | A * | 9/1967 | McCroy, Jr. et al. | 285/55 |
| 4,634,314 | A | 1/1987 | Pierce | 405/195 |
| 4,810,010 | A | 3/1989 | Jones | 285/55 |
| 4,875,717 | A | 10/1989 | Policelli | |
| 5,028,081 | A | 7/1991 | Fournier | |
| 5,443,099 | A | 8/1995 | Chaussepied et al. | |
| 6,050,612 | A | 4/2000 | Wolterman | |
| 6,405,762 | B1 | 6/2002 | Bunch | 138/109 |
| 6,719,058 | B1 * | 4/2004 | Salama et al. | 285/222.1 |
| 6,863,279 | B1 * | 3/2005 | Salama | 285/259 |
| 2003/0107186 | A1 | 6/2003 | Salama | |
| 2004/0086341 | A1 | 5/2004 | Salama et al. | |

FOREIGN PATENT DOCUMENTS

| | | |
|---|---|---|
| WO | WO 03/050380 | 6/2003 |
| WO | WO 2005/035933 | 4/2005 |

OTHER PUBLICATIONS

Salama et al., "The First Offshore Field Installation for a Composite Riser Joint", OTC 14018, presented at 2002 Offshore Technology Conference, Houston, Texas, May 6-9, 2002.
"Composites in Offshore Oil: A Design and Application Guide", 2002.
M. DeLuca, *Composites Shape Up For Risers*, Internet Article, Online pp. 1-8, retrieved from the Internet: URL:http://www.oilonline.com/news/features/oe/20001201.Composit.32.asp, restrieved on Jul. 15, 2005.
M. Salama et al., *Design Consideration for Composite Drilling Riser*, OTC 11006, pp. 3-5, May 3, 1999.

* cited by examiner

*Primary Examiner*—David Bochna
(74) *Attorney, Agent, or Firm*—Trop, Pruner & Hu, P.C.

(57) ABSTRACT

A composite marine riser may be formed, in one embodiment, of a pair of threaded metallic sections having threaded external surfaces. The threaded external surfaces may taper from a larger to a smaller diameter. The composite material may be formed over the threaded external surfaces, which surfaces serve to transfer force from the metallic sections to the composite material.

22 Claims, 4 Drawing Sheets

COMPOSITE MARINE RISER

BACKGROUND

This invention relates generally to drilling for oil and gas from a floating drilling rig.

In marine applications, the marine riser connects a rig on the water's surface to a well bore at the seabed. Drilling risers or production risers may be employed for offshore applications. A marine drilling riser is designed to facilitate a closed drilling fluid system, where fluid pumped down the drill pipe returns back to the drilling rig through a system from seabed to surface. Production risers, used in the completion phase of a subsea well, provide access to the well bore through the completion tubing deep into the well with return of the completion fluids or mud remaining within a closed pumping system from the deepest circulating position through the seabed to surface.

Generally, risers undergo severe tensile, bending and/or torsional loading while in operation. Currently and conventionally, risers are made of very high strength steel.

Tension is applied from the floating rig to the riser through the riser tensioner system on the drilling rig. The amount of applied tension is a function of the depth of water between the rig and the seabed floor. The deeper the drilling operation, the longer the riser that must be provided. The longer the riser, the greater the weight and the required tension that is applied to the floating drilling rig. Thus, the deck load on the rig and the applied tension are determined by the length of the riser which, in turn, is determined by the depth of the water over the drilling operation.

Risers are assembled in sections called joints which vary in length, but generally are about 70–75 feet long. While casing or drill pipe joints are threaded and screwed together, riser joints are connected using a high pressure flanges and bolts. Usually steel or titanium connectors or end fittings are used, especially so in deep water drilling operations. The joints need to absorb not only axial loads but also bending stresses and high vibrations that exist in hostile marine environments.

The use of composite materials to reduce the weight of risers has been proposed for some time. However, the use of composites has not been well received in the industry for a variety of reasons. One of those reasons is the need to bond the composite material to the metal connectors while maintaining the mechanical integrity of tensile steels or equivalent. Thus, a critical composite riser design element is the load transfer mechanisms between the integrated steel/composite tube body and the end fittings.

DETAILED DESCRIPTION

Figure 1:
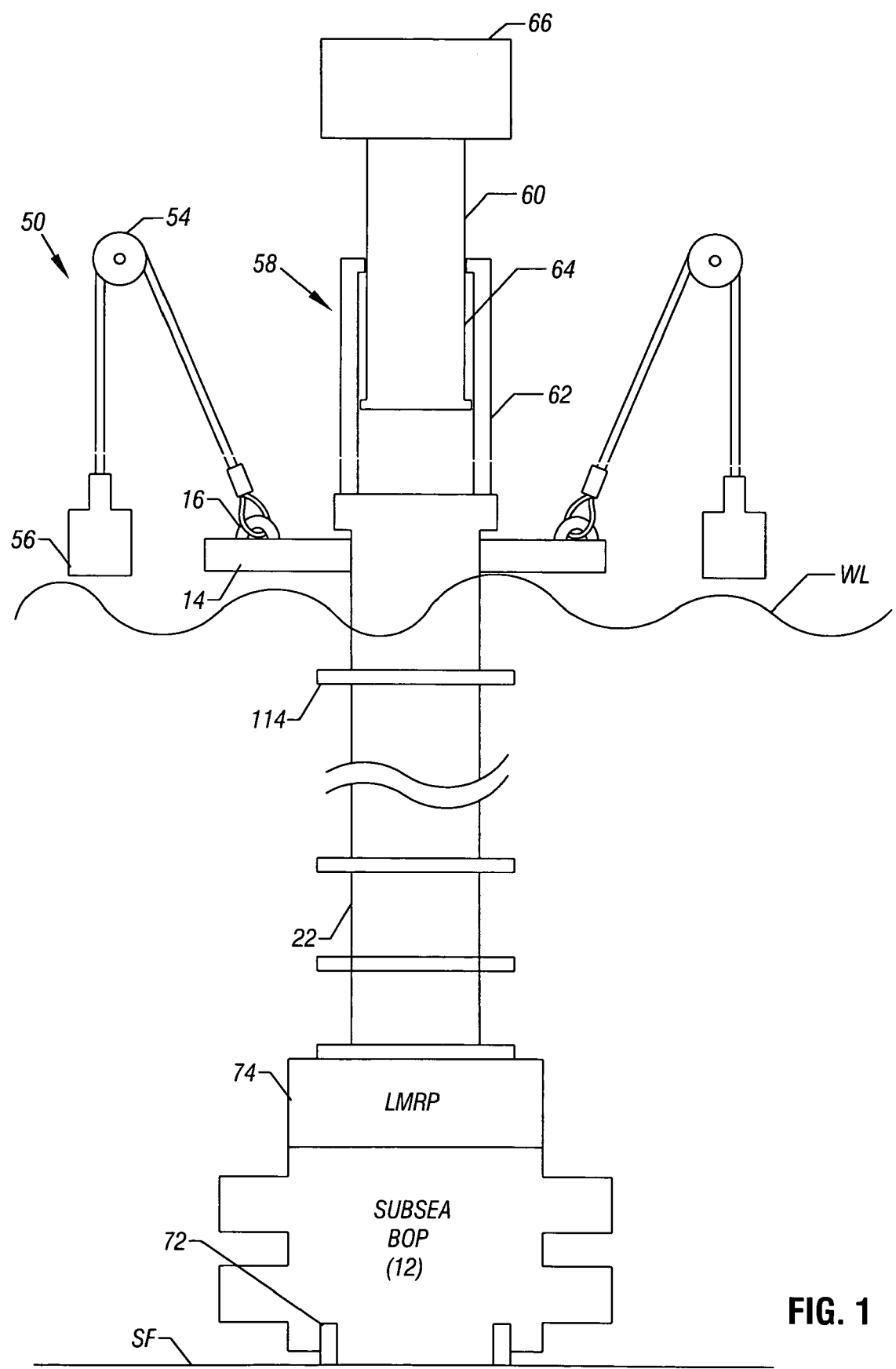
FIG. 1 is a schematic depiction of one embodiment of the typical subsea drilling set up in respect to an offshore environment, utilizing a floating drilling rig.

Referring to FIG. 1, a subsea convention includes a subsea blowout preventer (BOP) stack 12 on the seabed SF connected to the floating drilling rig 66 through a marine riser 22. The riser 22 is connected to a telescopic joint 58 that takes into account the drilling rig 10 heave.

The rig 66 has a tension ring 14 at the top of the marine riser 22 to be tensioned using ring tensioners 16. The tensioners 16 are coupled by pulleys or hydraulic systems 54 to hydraulic cylinders 56 to create a tensioning system 50.

The telescopic joint 58 (which is not under tension) allows the upper portion 60 of the apparatus to telescope in and out relative to the lower portion 62 in the event that the rig 66 is heaving relative to the tension ring 14. Seals 64 prevent fluid escape. The system 50 allows this relative movement and adjustment of relative positioning while maintaining tension on the riser 22, which extends from the floating rig 66 downwardly to the subsea BOP stack 12.

A lower marine riser package (LMRP) emergency disconnect enables the riser 22 to be disconnected from the subsea BOP 12. The wellhead 22 is also coupled to the subsea BOP 12.

Figure 2:
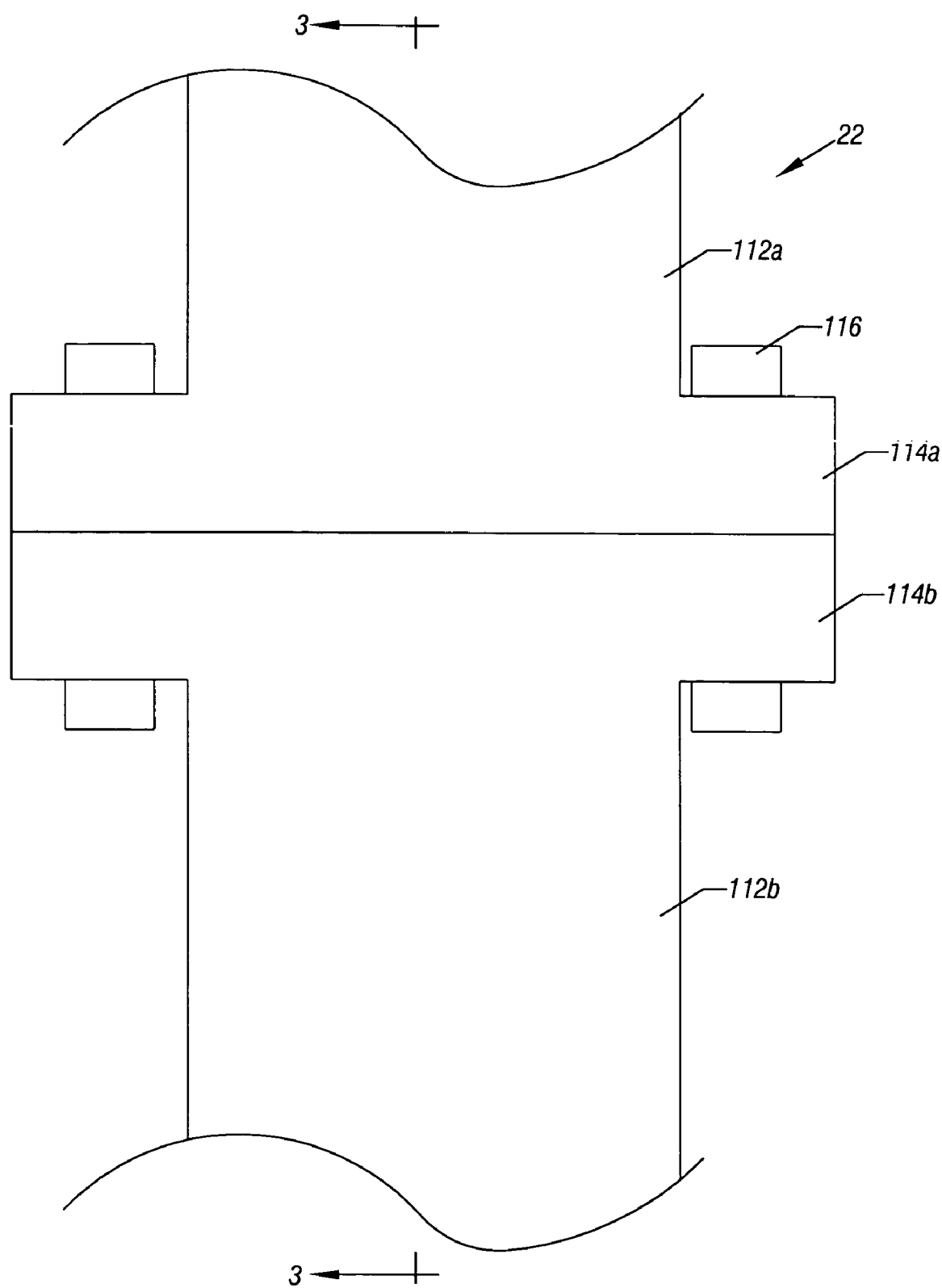
FIG. 2 is a partial, enlarged, front elevation view of a portion of the embodiment shown in FIG. 1 in accordance with one embodiment of the present invention.

Referring to FIG. 2. The riser joint 112 includes an upper joint 112a joined to a lower joint 112b through flanges 114 and bolts 116. The flanges 114 and bolts 116 may be made of high tensile steel or equivalent.

Figure 3:
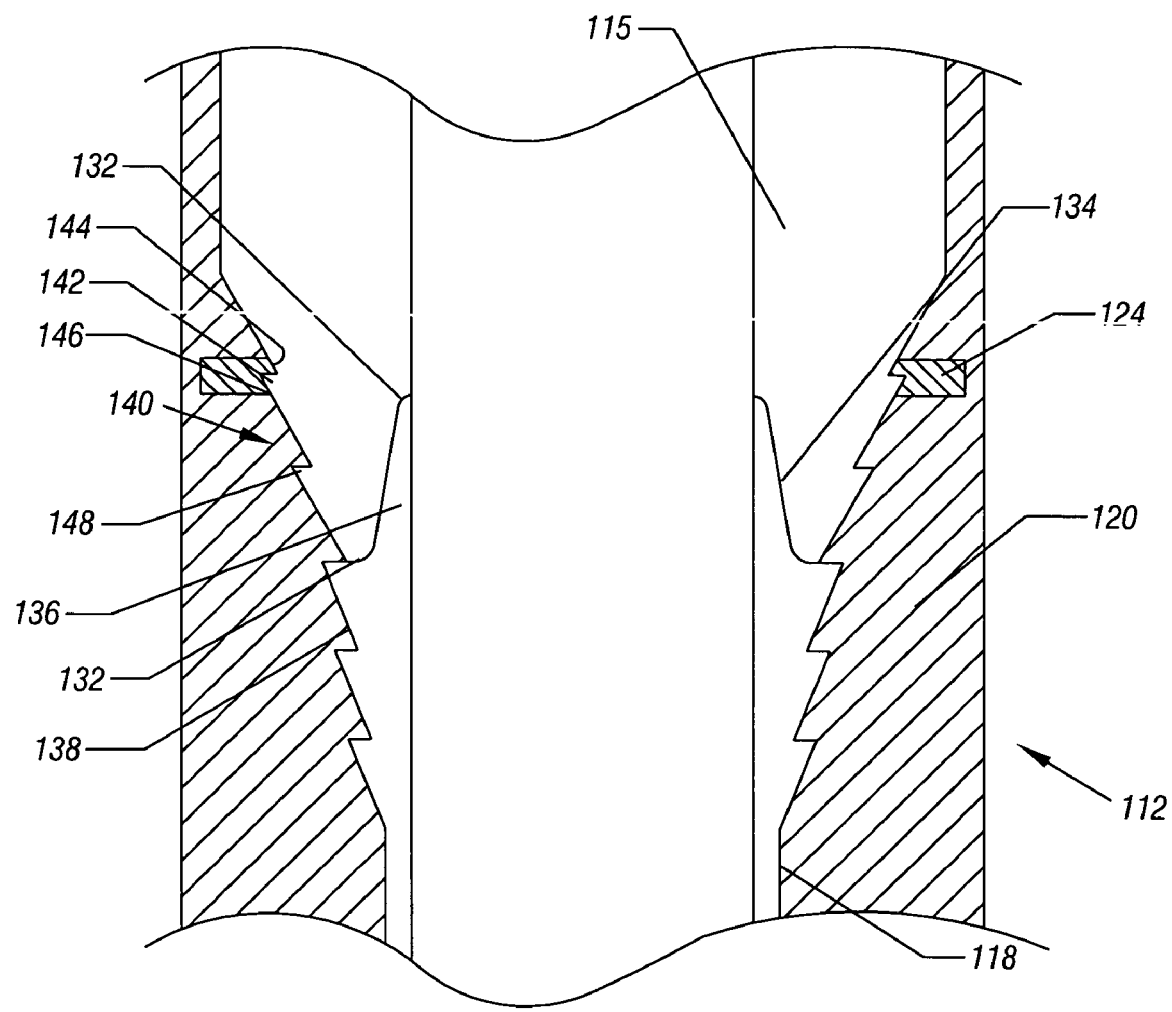
FIG. 3 is a partial, enlarged, cross-sectional view taken generally along the line 3—6 in FIG. 2.

Referring to FIG. 3, the upper and lower flanges 114 include integral end fittings 115. The fittings 115 are covered by a composite material 120 woven over the connection between the end fittings 115 and an inner metallic tube 118.

As used herein, composite material is a material that includes fibers in a binding matrix. Composite fibers may be glass, carbon, aramid, or other materials. The fiber may be encased in a polymer resin matrix that binds the fibers together and spreads loads across the fibers.

Resins may be generally thermoset or thermoplastic resins. Both resin types may include molecular polymer chains. Thermosets are cross-linked so they are fixed in one shape. Thermoplastic molecular chains may be processed at higher temperatures and may take a particular shape through molding. Unsaturated polyester resins are commonly used as thermosets.

Among the useful thermoset materials include polyesters, orthopolyesters, isopolyesters, vinyl esters, epoxies, and phenolics. Examples of suitable thermoplastics include engineered thermoplastics such as polyphenylene sulfide, polyvinylidene fluoride, polyetheretherketone, nylons, polypropylene, and polyethylene.

The composite material 120 may be made up in a variety of fashions. Among the suitable applications include pultrusion, filament winding, and molding.

Filament winding is an automated, high volume process. Machine set ups can include two axis mechanical chain drive operations, computer control, multi-axis, and multi-spindle systems capable of producing multiple lines of product at once. A wet winding machine may pull dry roving or tow from creoles or racks through a resin bath. As mandrel rotates on a spindle, the roving or tow delivery system reciprocates along the length of the mandrel, laying down helical ply after helical ply of material. A winding may also be performed using tow pre-impregnated with resin.

Returning to FIG. 3, the fitting 115 includes an externally threaded portion 134. The portion 134 may taper diametrically outwardly as it extends over the internally threaded riser liner reduced diameter section 136. The riser liner reduced diameter section 136 and the end fitting 115 have metal-to-metal seal regions 132 at opposed ends of their mating threads to form a threaded, torqued, pressure tight metal-to-metal sealing connection between the liner 118 and the flanges 114.

Thus, the length of the joint 112 is primarily taken up by the liner 118 that acts as a substrate on which the composite material 120 is helically wound. For example, the composite material 120 may be wound up using the liner 118 as a rotating mandrel in one embodiment of the present invention.

The external surface of the liner reduced diameter 136 has an external thread which forms a threaded joint 134 with the fitting 115. Thus, the liner 118 is simply rotated into threaded, sealing, torque loaded engagement with the end fitting 115. A good seal is formed by the seal regions 132 and the torsional integrity established through metal-metal seals regions 132.

The external surface of the fitting 115 includes a plurality of large helical screw threads 140. Similar helical screw threads 138 are formed on the exterior surface of the liner 118 proximate to the end fitting 115. The threads 138 and 140 effectively transfer loads to the composite material 120 and, particularly, transfer tension loads to the composite material 120. Thus, a substantial portion of the load on the joint 112 is carried by the composite material 120 and, particularly, by the thicker portion of a composite material 120 spaced from the end fittings 115.

The threaded surfaces of the fitting 115 and linear 118 taper diametrically inwardly as they extend away from the flange 114. This provides room for the composite material 120 in one embodiment of the present invention.

The threads 138 and 140 include a flat upper horizontal surface 142 facing the closest fitting 115 and extending generally transversely to the length of the joint 112. The threads 138 or 140 also have a slanted lower surface 148 which extends downwardly away from the horizontal surface 142 at an acute angle (for example approximately 30 to 40 degrees). The threads 138 and 140 may be much larger than the threads used for making the joint 134.

A metallic load ring 124 may be threaded onto the fitting 115 before the fitting 115 is made up with the liner 118. Thus, the ring 24 may be shaped to include a face with a thread groove 144 formed therein which matches the pointed end 146 of the threads 140. Thus, the ring 124 can simply be rotated and screwed upwardly along the helical threads 140 to a desired position along the length. Because the threads 140 expand radially as they extend away from the liner 118, eventually the ring 124 is frictionally locked in place on the fitting 115.

Once the composite material 120 is formed over the load ring 124, the load ring 124 is effective to transfer both rotary and tensile stress from the fitting 115 to the composite material 120. In one embodiment of the present invention, the load ring 124 may be positioned above the joint 134 to improve the strength of the overall structure.

Figure 4:
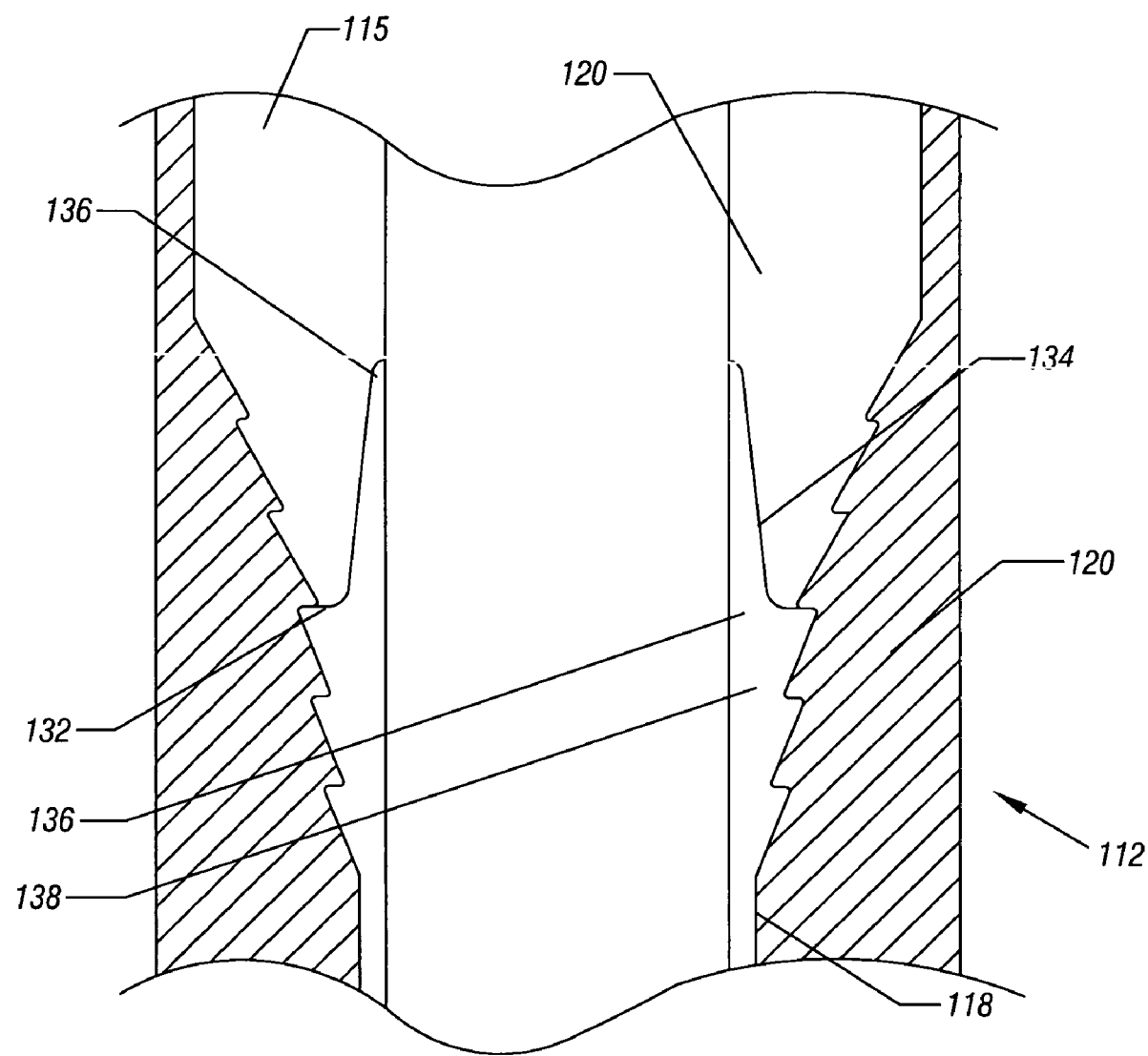
FIG. 4 is a partial, enlarged, cross-sectional-view taken generally along the line 3—6 in FIG. 2 in accordance with another embodiment of the present invention.

Referring to FIG. 4, in one embodiment, the ring 124 is not used but the structure otherwise operates similarly to the embodiment of FIG. 3.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A marine riser joint comprising:
   a pair of opposed end fittings having flanged ends and a threaded tubular region on opposed ends thereof;
   a metallic tube having a first external thread to thread into each of said opposed end fittings and a second external thread; and
   a composite material over said metallic tube.

2. The joint of claim 1 wherein said second external thread has a first surface extending generally perpendicularly to the length of said joint and a second surface extending away from said first surface at an acute angle, said second external thread being in contact with said composite material.

3. The joint of claim 1 wherein said end fittings include an externally threaded surface in contact with said composite material.

4. The joint of claim 3 including a locking ring threaded on said external surface of said end fitting.

5. The joint of claim 1 wherein said external surface of said end fitting reduces in diameter as it extends away from said flanged ends.

6. The joint of claim 5 wherein said external surface of said metallic tube increases in diameter as it extends away from said flanged ends.

7. The joint of claim 1 wherein said composite material extends over said tubular region.

8. A marine riser joint comprising:
   a tubular body including a tapered metallic portion which tapers from a larger diameter to a smaller diameter, said tapered metallic portion having a threaded external surface, said body including a composite material contacting said threaded external surface of said tapered metallic portion; and
   a pair of opposed end fittings coupled to said tubular body, said end fittings have a threaded external surface engaged with said composite material and said end fittings including flanges.

9. The joint of claim 8 wherein said opposed end fittings include threads and said tapered metallic portion threads into said opposed end fittings along a threaded region.

10. The joint of claim 9 including a pair of opposed torque loaded metal-to-metal seals formed in said threaded region.

11. The joint of claim 10 wherein said threaded external surface includes threads having a first surface arranged generally perpendicularly to the length of said joint and a second surface extending at an acute angle downwardly therefrom.

12. The joint of claim 8 including a locking ring threaded on said threaded external surface of said tapered metallic portion.

13. A method comprising:
   forming a marine riser joint comprising forming a tubular body including a tapered metallic portion that tapers from a larger diameter to a smaller diameter, said tapered metallic portion having a threaded external surface;
   forming a pair of opposed end fittings coupled to said tubular body;
   covering said tubular body in at least a portion of said end fittings with a composite material; and
   securing a locking ring on external threads on said end fittings and covering at least a portion of said end fittings and said metallic tube with a composite material.

14. The method of claim 13 including forming a metal-to-metal seal between said tubular body and said end fitting.

15. The method of claim 14 including torque loading said metal-to-metal seal by threading said tubular body into opposed end fittings.

16. A marine riser joint comprising:
a tubular body including a tapered metallic portion which tapers from a larger diameter to a smaller diameter, said tapered metallic portion having a threaded external surface, said body including a composite material contacting said threaded external surface of said tapered metallic portion;
a pair of opposed end fittings coupled to said tubular body; and
a locking ring threaded on said threaded external surface of said tapered metallic portion.

17. The joint of claim 16 wherein said end fittings have a threaded external surface engaged with said composite material.

18. The joint of claim 16 wherein said end fittings including flanges.

19. A marine riser joint comprising:
a tubular body including a tapered metallic portion which tapers from a larger diameter to a smaller diameter, said tapered metallic portion having a threaded external surface, said body including a composite material contacting said threaded external surface of said tapered metallic portion; and
a pair of opposed end fittings coupled to said tubular body, said end fittings having a threaded external surface engaged with said composite material.

20. The joint of claim 19 including a locking ring threaded on said threaded external surface of said tapered metallic portion.

21. A marine riser joint comprising:
a tubular body including a tapered metallic portion which tapers from a larger diameter to a smaller diameter, said tapered metallic portion having a threaded external surface, said body including a composite material contacting said threaded external surface of said tapered metallic portion;
a pair of opposed end fittings coupled to said tubular body, said opposed end fittings include threads and said tapered metallic portion threads into said opposed end fittings along a threaded region; and
a pair of opposed torque loaded metal-to-metal seals formed in said threaded region, said threaded external surface includes threads having a first surface arranged generally perpendicularly to the length of said joint and a second surface extending at an acute angle downwardly therefrom.

22. The joint of claim 21 wherein said end fittings including flanges.

* * * * *